(12) United States Patent
Sharpless et al.

(10) Patent No.: US 6,901,808 B1
(45) Date of Patent: Jun. 7, 2005

(54) CAPACITIVE MANOMETER HAVING REDUCED PROCESS DRIFT

(75) Inventors: Leonard J. Sharpless, Fremont, CA (US); Neil Benjamin, Palo Alto, CA (US); Jeffrey W. Fish, Livermore, CA (US)

(73) Assignee: Lam Research Corporation, Fremont, CA (US)

( * ) Notice: Subject to any disclaimer, the term of this patent is extended or adjusted under 35 U.S.C. 154(b) by 9 days.

(21) Appl. No.: 10/361,860

(22) Filed: Feb. 11, 2003

Related U.S. Application Data

(60) Provisional application No. 60/357,013, filed on Feb. 12, 2002.

(51) Int. Cl.[7] ................................................. G01L 9/12
(52) U.S. Cl. ........................................ 73/724; 73/718
(58) Field of Search ........................... 73/718, 724, 700

(56) References Cited

U.S. PATENT DOCUMENTS

| | | | |
|---|---|---|---|
| 4,785,669 A | 11/1988 | Benson et al. | |
| 5,456,945 A | 10/1995 | McMillan et al. | |
| 5,759,923 A | 6/1998 | McMillan et al. | |
| 5,811,685 A | 9/1998 | Grudzien | |
| 5,868,159 A | 2/1999 | Loan et al. | |
| 5,939,639 A | 8/1999 | Lethbridge | |
| 5,948,169 A | 9/1999 | Wu | |
| 6,024,044 A * | 2/2000 | Law et al. | 118/723 E |
| 6,052,176 A | 4/2000 | Ni et al. | |
| 6,084,745 A | 7/2000 | Slezak | |
| 6,206,971 B1 | 3/2001 | Umotoy et al. | |
| 6,216,726 B1 * | 4/2001 | Brown et al. | 137/486 |
| 6,382,031 B1 * | 5/2002 | Mast et al. | 73/755 |
| 6,407,009 B1 | 6/2002 | You et al. | |
| 6,443,015 B1 * | 9/2002 | Poulin et al. | 73/724 |
| 6,451,159 B1 | 9/2002 | Lombardi et al. | |
| 6,468,329 B2 * | 10/2002 | Cho et al. | 95/144 |
| 2001/0004879 A1 | 6/2001 | Umotoy et al. | |

* cited by examiner

*Primary Examiner*—Edward Lefkowitz
*Assistant Examiner*—Andre Allen
(74) *Attorney, Agent, or Firm*—Burns, Doane, Swecker & Mathis, LLP

(57) ABSTRACT

A capacitive manometer includes a flow passage through which gas can enter the manometer, a deflectable diaphragm, and a filter arranged in the flow passage. The filter is capable of removing condensable vapors from the gas so that the condensable vapors do not reach and deposit on the diaphragm. The capacitive manometer can include a cooling unit arranged to cool the filter so as to enhance removal of condensable vapors from the gas by the filter. The capacitive manometer can include a baffle having gas passages distributed to control distribution of condensable vapors, which pass through the baffle, on the diaphragm.

26 Claims, 7 Drawing Sheets

CAPACITIVE MANOMETER HAVING REDUCED PROCESS DRIFT

This application claims priority under 35 U.S.C. § 119 to U.S. Provisional Application No. 60/357,013 entitled COMPACT VACUUM COLD STRAP FOR PREVENTING VOLATILE MATERIAL FROM CONDENSING ON THE SENSE ELEMENT OF A PRESSURE MEASUREMENT DEVICE and filed on Feb. 12, 2002, the entire content of which is hereby incorporated by reference.

FIELD OF INVENTION

The invention relates to fluid pressure sensors and, more particularly, to a capacitive manometer.

BACKGROUND OF INVENTION

Plasma processing apparatuses are used to process substrates by processes including plasma etching of semiconducting, dielectric and metallic materials, physical vapor deposition, chemical vapor deposition (CVD), ion implantation and resist removal. Such substrates include, for example, semiconductor wafers and flat screen displays. The substrates can have various regular and irregular shapes and sizes.

A plasma processing apparatus used in semiconductor material processing includes a reaction chamber in which a substrate to be processed is supported on a substrate support. Process gas is introduced into the reaction chamber by a gas distribution system and an energy source energizes the process gas to generate a plasma. During plasma etching processes, the substrate is etched by interaction with the plasma. During deposition processes, material is deposited on the substrate.

During plasma processing of substrates in plasma processing apparatuses, the pressure within the reaction chamber is controlled. Variations in the reaction chamber pressure can affect substrate processing performance, such as the substrate etch rate or material deposition rates onto the substrate. Accordingly, plasma processing apparatuses include pressure sensors that measure the reaction chamber pressure.

Capacitive manometers have been used as a pressure sensor to measure the reaction chamber pressure in plasma processing apparatuses. Capacitive manometers include a flexible diaphragm having a front side at the reaction chamber pressure and a back side at a set low pressure. The diaphragm is deflected by fluid pressure acting on the front side exceeding the set low pressure acting on the back side of the diaphragm. Deflection of the diaphragm changes the capacitance measured by the manometer, which in turn is related to the reaction chamber pressure. Exemplary capacitive manometers are disclosed in U.S. Pat. Nos. 4,785,669; 5,456,945; 5,759,923; 5,811,685; 5,939,639; 5,948,169; 6,443,015 and commonly-assigned U.S. Pat. No. 6,451,159.

SUMMARY OF INVENTION

A capacitance manometer is provided, which has reduced process drift when used to measure the pressure of gases containing condensable vapors. The capacitive manometer can be used in various applications, such as to measure pressure inside of a reaction chamber of a plasma processing apparatus.

In a preferred embodiment, the capacitive manometer comprises a housing, a diaphragm inside the housing, a flow passage through which gas enters the housing, and a filter in the flow passage. The filter includes a downstream end, which preferably is located proximate to the diaphragm. The filter can be used to remove condensable vapors from the gas upstream of the diaphragm.

The filter can have various constructions including one or more gas passages. In a preferred embodiment, the filter comprises a body and a plurality of gas passages extending longitudinally along the body. The gas passages can be disposed at the outer surface of the body and/or disposed inwardly from the outer surface. The gas passages can have various configurations that provide a tortuous gas flow path through the filter.

Another preferred embodiment of the manometer comprises a flow passage, a filter in the flow passage, and a cooling unit arranged to cool the filter. Cooling the filter enhances removal of condensable vapors from a gas by the filter. The cooling unit preferably includes a Peltier cooler.

Another preferred embodiment of the manometer comprises a diaphragm, a flow passage, and a filter in the flow passage upstream of the diaphragm. The filter preferably includes at least one gas passage, which has (i) a maximum transverse dimension, (ii) a length and (iii) at least a minimum aspect ratio defined by the ratio of the length to the maximum transverse dimension.

Another preferred embodiment of the capacitive manometer comprises a diaphragm having a face exposed to a gas and a baffle including a plurality of gas passages. The gas passages preferably are arranged in the baffle to control deposition of condensable vapors contained in the gas on the face of the diaphragm.

BRIEF DESCRIPTION OF THE DRAWINGS

Preferred embodiments will be readily understood by the following detailed description in conjunction with the accompanying drawings, in which.

DETAILED DESCRIPTION OF PREFERRED EMBODIMENTS

A capacitive manometer for measuring gas pressure is provided. The capacitive manometer can be used to measure gas pressure in various applications, including, for example, in reaction chambers of plasma processing apparatuses.

Figure 1:
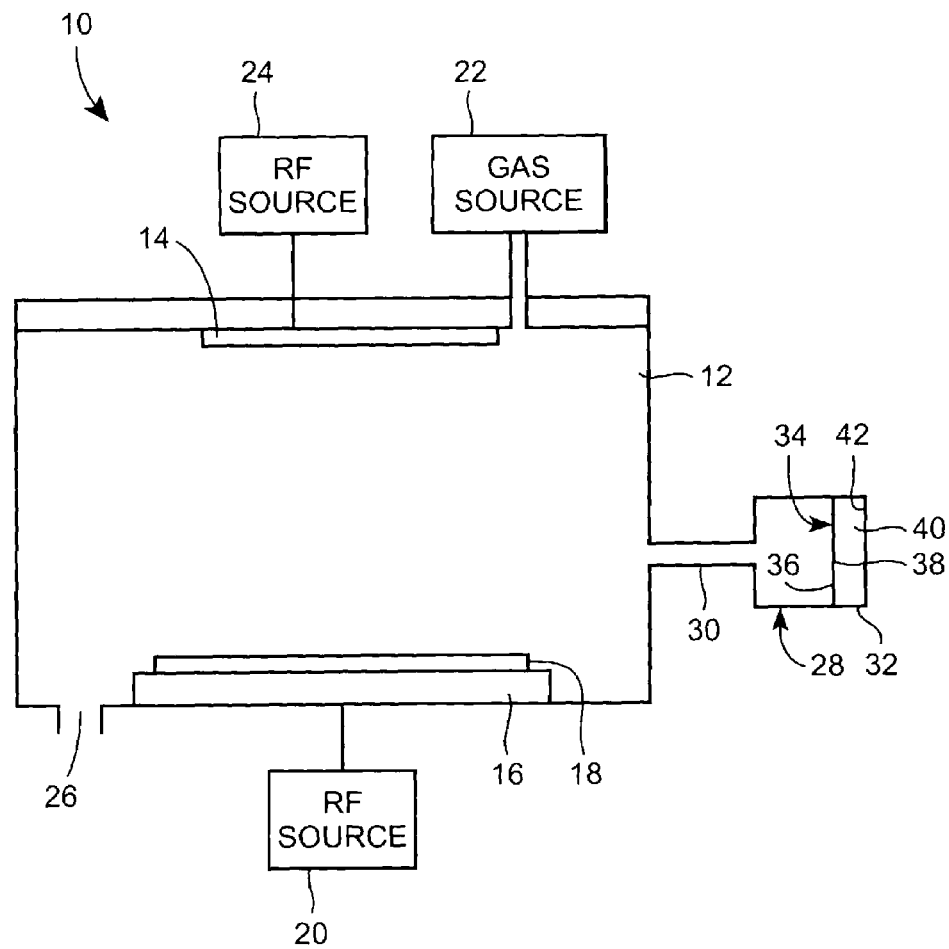
FIG. 1 illustrates an exemplary plasma reactor in which preferred embodiments of the capacitive manometer can be used.

An exemplary plasma reactor 10 with which preferred embodiments of the capacitive manometer can be used is illustrated in FIG. 1. However, it will be appreciated by those having ordinary skill in the art that the capacitive manometer can be used in various types of processing reactors (e.g., plasma reactors and thermal reactors) in which the measurement and control of chamber pressure is desired. The plasma reactor 10 comprises a reaction chamber 12 including an upper electrode 14 and a substrate holder 16 supporting a substrate 18. The substrate holder 16 can include, for example, an electrostatic chuck (ESC) or a mechanical chuck. An RF source 20 provides RF bias to the substrate 18 supported on the substrate holder 16. The substrate 18 can be, for example, a semiconductor wafer. A gas source 22 supplies process gas into the reaction chamber 12. The gas source 22 can comprise, for example, a showerhead system or the like. An RF source 24 is disposed at the top portion of reaction chamber 12 to generate a plasma from the process gas and to maintain the plasma in the reaction chamber. The plasma reactor 10 can, alternatively, include various other energy sources for generating a plasma. An exhaust outlet 26 is disposed at the bottom portion of the plasma reactor 10. The plasma reactor 10 includes vacuum pumping apparatus (not shown) for maintaining the interior of the reaction chamber 12 at a desired pressure during plasma processing.

A capacitive manometer 28 is arranged to measure the pressure in the reaction chamber 12. The manometer 28 is in fluid communication with the reaction chamber 12 via a flow passage 30. The manometer 28 includes a housing 32 and a diaphragm 34 inside the housing. The diaphragm 34 includes a front side 36 and a back side 38. The manometer 28 includes a low pressure region 40 at the back side 38 of the diaphragm 34. The low pressure region 40 preferably is maintained at a set low pressure, for example, near absolute vacuum.

The manometer 28 is operable to measure pressure inside the reaction chamber 12, for example, a vacuum generated in the reaction chamber 12 during plasma processing of the substrate 18. The front side 36 of the diaphragm 34 is at the reaction chamber 12 pressure. Differences between the pressure in the reaction chamber 12 and the pressure in the low pressure region 40 at the back side 38 of the diaphragm 34 cause the diaphragm 34 to deflect. Particularly, the diaphragm 34 is deflected when pressure acting on the front side 36 of the diaphragm 34 exceeds the pressure at the low pressure region 40. The resulting deflection of the diaphragm 34 relative to a fixed surface of the manometer 28, such as surface 42, produces a change in measured capacitance as a function of the magnitude of the pressure differential. The change in capacitance due to the deflection of the diaphragm 34 is in turn correlated to the pressure at the front side 36 of the diaphragm 34 and thus the pressure inside the reaction chamber 12.

It has been determined that during operation of plasma processing apparatuses, such as the plasma reactor 10, volatile, material enters the flow passage 30 from the reaction chamber and can form deposits on the front side 36 of the diaphragm 34 of the manometer 28. It has also been determined that some materials (for example, AlF, which forms by reaction between AlCl and fluorine contained in certain process gases used in plasma processing of semiconductor substrates, such as $CF_4$ and $CHF_3$), can form solid deposits on the front side 36 of the diaphragm 34. Such solid deposits are not volatilized and remain on the front side 36 when the diaphragm 34 is heated to temperatures sufficient to volatilize other deposits, such as AlCl deposits, formed on the front side 36. Consequently, deposits of materials, such as AlF, form a film on the front side 36 of the diaphragm 34, which film can impart differential stress, for example, tensile stress, and increase the mass of the diaphragm 34. The stress can produce curvature of the diaphragm 34, resulting in a constant deflection of the diaphragm 34. For example, if the deposition on the front side 36 is center dominant, then the curvature may have one form, while if the deposition is greater nearer to the periphery of the diaphragm 34, deflection can be in an opposite direction, which may be interpreted as a negative pressure shift. Consequently, an offset or drift can be introduced in the pressure readings made by the manometer 28, which can adversely affect the accuracy of the pressure readings. As a result, the accuracy of control of the reaction chamber 12 pressure during plasma processing operations based on such inaccurate pressure readings provided by the manometer 28 can be adversely affected.

Figure 2:
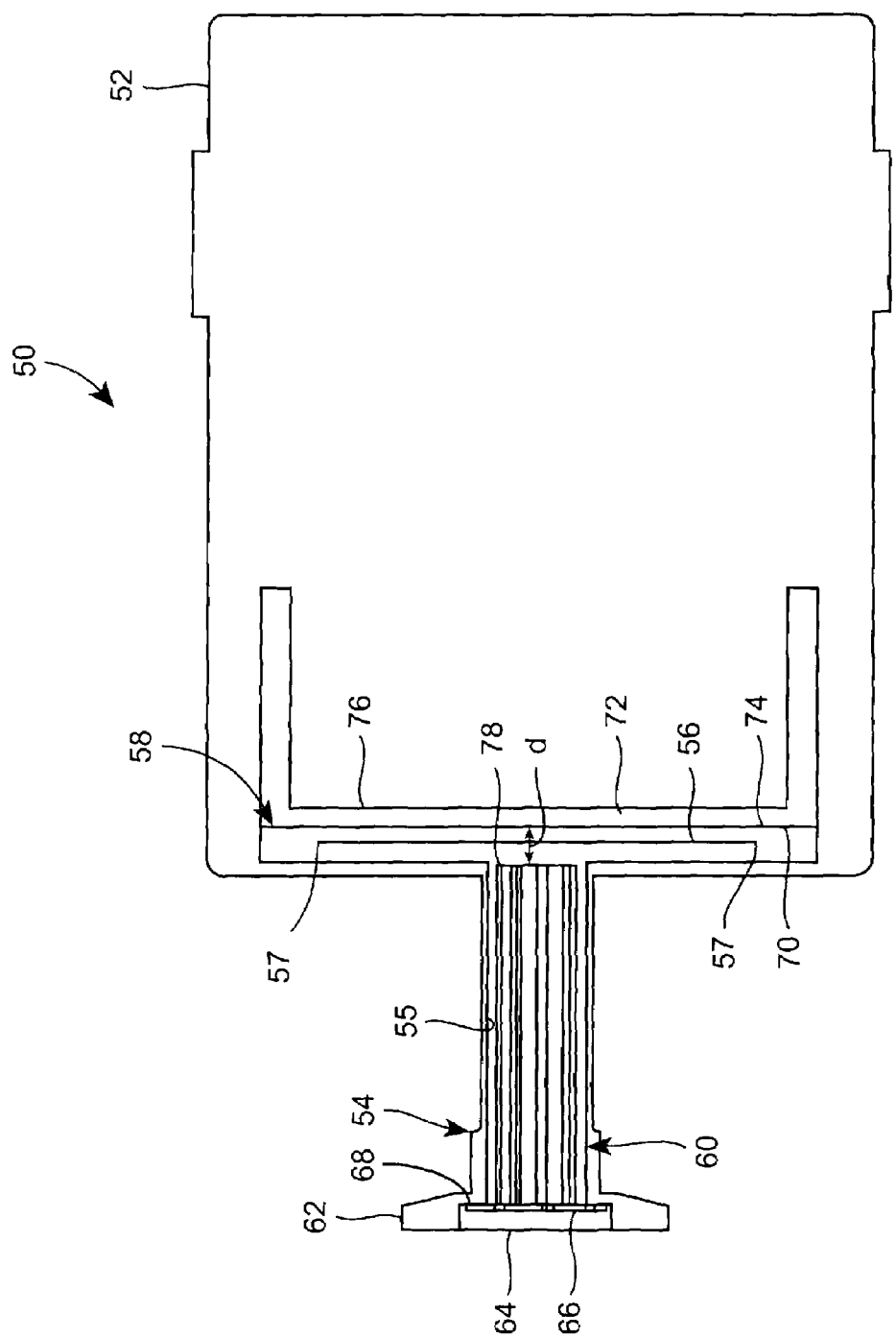
FIG. 2 illustrates a preferred embodiment of the capacitive manometer.

Embodiments of the capacitive manometer according to the invention can provide reduced offset or drift. A preferred embodiment of the capacitive manometer 50 is shown in FIG. 2. The manometer 50 includes a housing 52 and a flow passage 54. A baffle 56 and a diaphragm 58 are arranged in the housing 52, and a filter 60 is arranged in the flow passage 54. The flow passage 54 preferably includes a mounting flange 62 for mounting the manometer 50 to a vessel, such as a wall of a reaction chamber of a plasma processing apparatus. Gas enters the flow passage 54 from the vessel at the inlet end 64. For example, gas can enter the flow passage 54 during pressure changes in the reaction chamber and/or by diffusion.

During operation of the manometer 50, the front side 70 of the diaphragm 58 is at the pressure of gas within the vessel that is in fluid communication with the manometer. For example, the pressure at the front side 70 of the diaphragm 58 may be from about 0–100 mTorr when the manometer 50 is used to measure pressure within a reaction chamber of a plasma processing apparatus. The manometer 50 includes a low pressure region 72 at the back side 74 of the diaphragm 58. The low pressure region 72 may be at a pressure of about $10^{-7}$ torr or less. Differences in pressure between the pressure in the vessel and the pressure in the low pressure region 72 cause the flexible diaphragm 58 to deflect. The resulting deflection of the diaphragm 58 relative to a fixed surface of the manometer 50, such as surface 76, produces a change in the measured capacitance as a function of the magnitude of the pressure differential. The capacitance change caused by the deflection of the diaphragm 58 is correlated to the pressure inside the vessel.

A preferred embodiment of the diaphragm 58 is of a single piece of material having uniform properties. However, the diaphragm can be of multipiece construction and/or have non-uniform properties. For example, the diaphragm can include an inner portion and an outer portion surrounding the inner portion, wherein the outer portion is flexible enough to deflect under pressure differentials on opposite sides of the diaphragm. The material or materials of the diaphragm can be of metal, such as a nickel chromium alloy (for example, Inconel), polymer and/or ceramic material. The metal or ceramic material has suitable properties, which include sufficient flexibility and may preferably also include a low coefficient of thermal expansion and resistance to corrosive process gases, such as those used in a reaction chamber of a plasma processing apparatus or in other types of processing reactors.

The filter 60 is constructed to remove condensable vapors from gases that enter the flow passage 54 from the vessel, to thereby reduce the amount of such vapors that may reach and deposit on the front side 70 of the diaphragm 58. Consequently, condensable vapors removed from the gas are prevented from forming solid deposits on the front side 70. As used herein, the term "condensable vapors" includes gases that may form any undesired deposit on the diaphragm 58, such as by condensation from the gaseous state, chemical reaction and/or other means. As explained above, such deposits may not be removable from the diaphragm by certain measures, such as heating, and consequently may adversely affect the accuracy of pressure readings by the manometer 50.

The filter 60 is preferably arranged in the manometer 50 to minimize the distance, d, between the downstream end 78 of the filter and the front side 70 of the diaphragm 58. The downstream end 78 of the filter 60 preferably is spaced from the front side 70 of the manometer 58 to allow full flow between the downstream end 78 and the diaphragm 58, while also minimizing the volume between the downstream end 78 and the diaphragm 58. The volume between the downstream end 78 of the filter 60 and the diaphragm 58 acts as a low-pass acoustic filter. By preferably minimizing this volume, the corresponding time constant is decreased without significantly reducing gas flow to the diaphragm 58, resulting in a faster pressure reading response time by the manometer 50, which in turn can improve real time process control of the pressure within the vessel based on the manometer readings.

Figure 3:
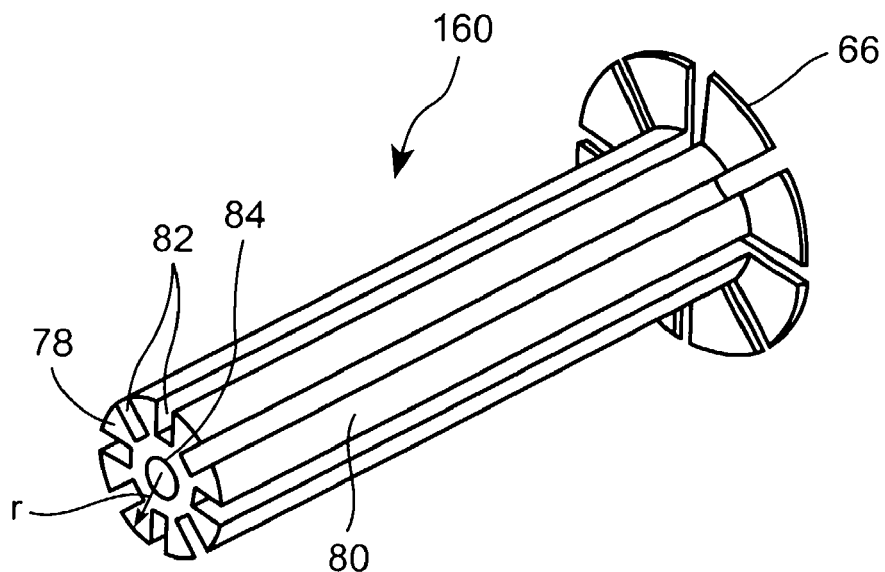
FIG. 3 illustrates a preferred embodiment of a filter used in the capacitive manometer.

The downstream end 78 of the filter 60 preferably is spaced from about 1 mm to about 5 mm from the diaphragm 58 in order to reduce the volume between the filter 60 and the diaphragm 50. FIG. 3 shows a preferred embodiment of the filter 160, which includes a cylindrical body 80 having a downstream end 78 and a radius, r. The downstream end 78 of the filter 160 preferably is spaced from the diaphragm 58 by no more than about the radius, r, when incorporated in the manometer 50, such as in the preferred embodiment shown in FIG. 2.

The embodiment of the filter 160 shown in FIG. 3 preferably has a high surface area to volume ratio, which increases the probability of condensable vapor molecules contained in the gas present in the flow passage 54 colliding with surfaces of the filter 160 and being removed from the gas by the filter 160. The filter 160 can have various constructions that provide a high surface area to volume ratio. For example, the filter 160 preferably has a collimated configuration including a plurality of parallel gas passages 82, which extend longitudinally along the length of the filter. The gas passages 82 can have various cross-sectional shapes, such as circular, semi-circular, rectangular, square and triangular, as well as other regular and irregular shapes. The number and size of the gas passages 82 can be varied to provide a desired surface area to volume ratio of the gas passages, as well as a suitable resistance (permeability) to gas flow through the filter 160.

Figure 4:
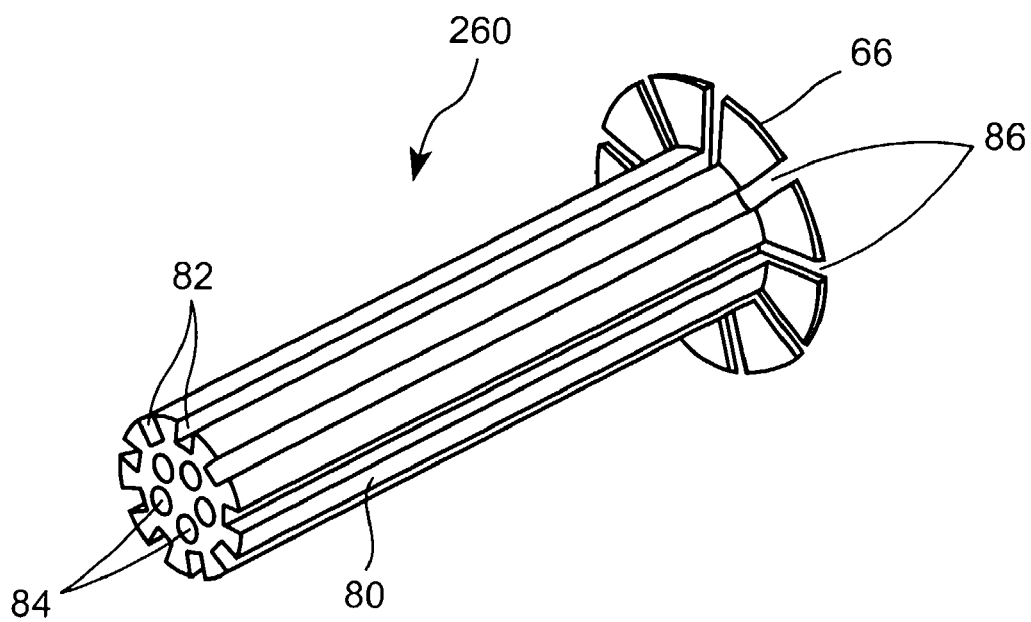
FIG. 4 illustrates another preferred embodiment of the filter including internal gas passages.

The filter 160 preferably also includes one or more internal gas passages 84 to provide increased surface area for gas flow through the filter, as well as to reduce flow resistance through the filter. The filter 160 shown in FIG. 3 includes a single internal gas passage 84. FIG. 4 shows another preferred embodiment of the filter 260 including a plurality of internal gas passages 84. The gas passages 84 in the filters 160, 260 can have various cross-sectional shapes, such as circular, oval, rectangular, square and triangular, as well as other regular and irregular shapes. The number and size of the gas passages 84 can be varied in the filters 160, 260 to provide a desired surface area to volume ratio of the gas passages 84, as well as to control flow resistance through the filter.

The filters 160, 260 each preferably include a flange 66, which abuts a surface 68 of the flow passage 54 to retain the filter in the flow passage 54. The flange 66 preferably includes a plurality of gas passages 86 through which gas enters the filter. The gas passages 86 are in fluid communication with the gas passages 82 in the body 80. The gas passages 86 can have any suitable shape and size, such as the slotted shape shown in FIGS. 3 and 4.

Figure 5:
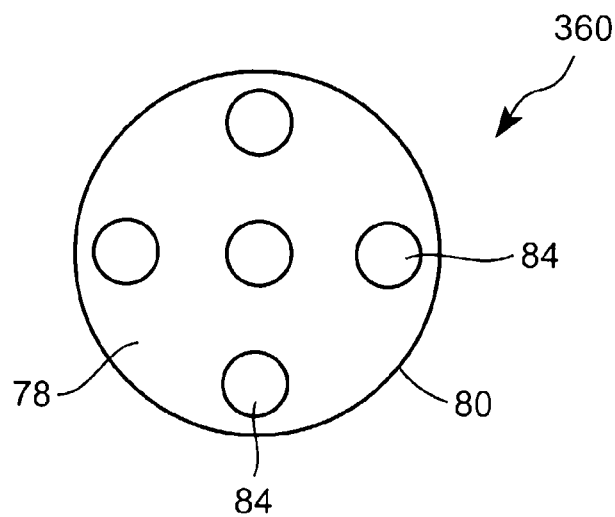
FIG. 5 is an end view of another preferred embodiment of the filter showing the arrangement of gas passages.
Figure 6:
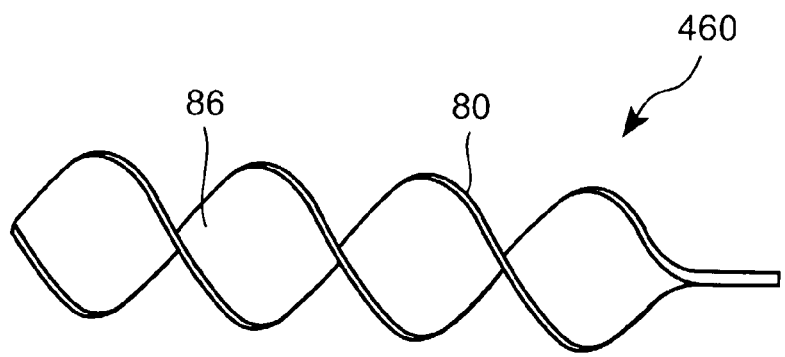
FIG. 6 illustrates another preferred embodiment of the filter having a spiral configuration.
Figure 7:
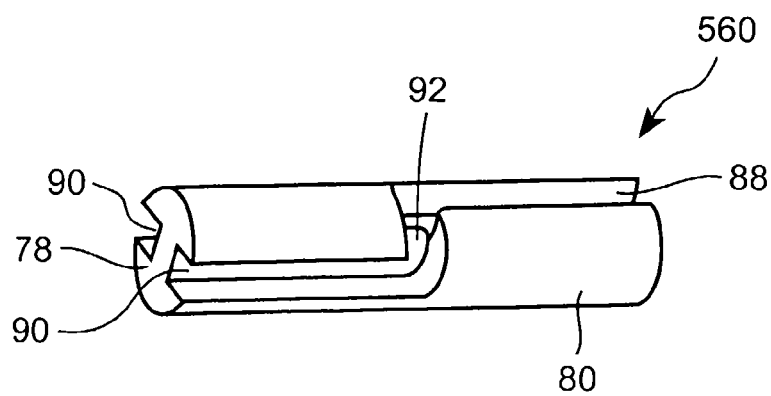
FIG. 7 illustrates another preferred embodiment of the filter.

FIGS. 5–7 illustrate alternative preferred embodiments of the filter that can be used in the manometer 50. The filter 360 shown in FIG. 5 includes a body 80 and a plurality of internal gas passages 84. The gas passages 84 can have any suitable shape, size and arrangement. The size and number of the gas passages 84 can be varied to increase the amount of surface area of the filter 360 exposed to gas flow, thereby increasing the probability of removing condensable vapors from the gas onto the filter 360.

The filter 460 shown in FIG. 6 includes a spiral body 80 and a spiral gas passage 86 extending longitudinally along the body 80. The spiral gas passage 86 has high tortuosity and does not provide a direct line of sight through the filter 460 to the diaphragm 58. Gas flowing longitudinally through the gas passage 86 must make numerous direction changes, which increases the probability of condensable vapors being removed from the gas onto the filter 460. In addition, the spiral configuration of the filter 460 provides a high aspect ratio, which is preferable as described in greater detail below.

The filter 560 shown in FIG. 7 includes a body 80 and two gas passages (only one gas passage is shown in its entirety). The gas passages preferably each include a first portion 88, a second portion 90 non-collinear with the first portion 88, and a connecting portion 92 providing fluid communication between the first portion 88 and second portion 90. This gas passage configuration does not provide a direct line of sight through the filter 560 to the diaphragm 58. Gas flowing through the filter 560 must change direction as it passes from the first portion 88 into the connecting portion 92, and again as it passes from the connecting portion 92 into the second portion 90. The multiple direction changes made by the gas increase the probability of condensable vapors contained in the gas being removed from the gas onto the filter 560.

The gas passages in the filter, such as in the filters 160, 260, 360, 460, 560 shown in FIGS. 3–7, respectively, preferably have at least a minimum aspect ratio. As used herein, the term "aspect ratio" is defined as the ratio of the length of a gas passage to the maximum transverse dimension of the gas passage (i.e., aspect ratio=gas passage length/gas passage maximum transverse dimension). For example, the maximum transverse dimension of a circular gas passage is the diameter of the gas passage. The aspect ratio of the one or more gas passages in the filters 160, 260, 360, 460, 560 is preferably at least about ten. For example, in a preferred embodiment, the filters 160, 260, 360, 460, 560 have a length of from about 0.5 inch to about 3 inch. The gas passages in the filters preferably have a corresponding maximum transverse dimension of less than about 0.05 for a 0.5 inch filter length to less than about 0.3 inch for a 3 inch filter length in such preferred embodiment.

The filter 60 preferably is configured to fit tightly within the flow passage 54 of the manometer 50 to minimize bypass gas flow between the outer surface of the body of the filter and the inner surface 55 of the flow passage (FIG. 2). For example, when the filter is used in a circular flow passage 54, the body of the filter preferably has a circular cross section and a diameter that closely matches the inner diameter of the flow passage 54.

The filter 60 can be of various materials including metals, such as aluminum, aluminum alloys, stainless steel or the like; graphite; polymers, such as polyimide and the like, and other suitable materials. The material of the filter preferably is corrosion resistant with respect to gases that are encountered during use of the manometer 50 to measure pressure in a vessel.

The filter 60 can be made by any suitable process, such as by forming gas passages in a material by drilling, cutting or other suitable machining process, or by an etching process. Alternatively, the filter including gas passages can be made directly by a suitable casting or molding process.

The manometer 50 can include a single filter 60, or alternatively can include two or more filters arranged in series in the flow passage 54. For example, the manometer can include two of any of the filters 160, 260, 360, 460, 560 shown in FIGS. 3–7. In a preferred embodiment, two or more filters are arranged in the flow passage with the gas passages in the filters being non-collinear with respect to each other. Misalignment of the gas passages increases the tortuosity of the gas flow path through the filters, which can increase the probability of condensable vapors being removed from the gas onto the filters.

In another preferred embodiment, the manometer 50 includes a cooling unit arranged to cool the filter 60 to a temperature effective to increase the probability of condensable vapor deposition on surfaces of the filter. Specifically, reducing the temperature of a condensable material reduces its vapor pressure. By reducing the vapor pressure, the condensable material transforms from a vapor to a solid at low pressures, such as the operating pressures in a plasma reactor during plasma processing of semiconductor substrates. The cooled filter disposed in the gas flow passage creates conditions favorable for gaseous molecules to collide with surfaces of the gas passages of the filter. The collisions of the gaseous molecules with cooled surfaces of the filter reduce the temperature and vapor pressure of the gas. After a sufficient number of collisions with the filter, the gas is cooled to a sufficiently low temperature to stick to the filter and thus be prevented from reaching the diaphragm 58. Non-condensable gases, in contrast, have a much lower vapor pressure and can pass through the cooled filter without being removed from the gas.

Figure 8:
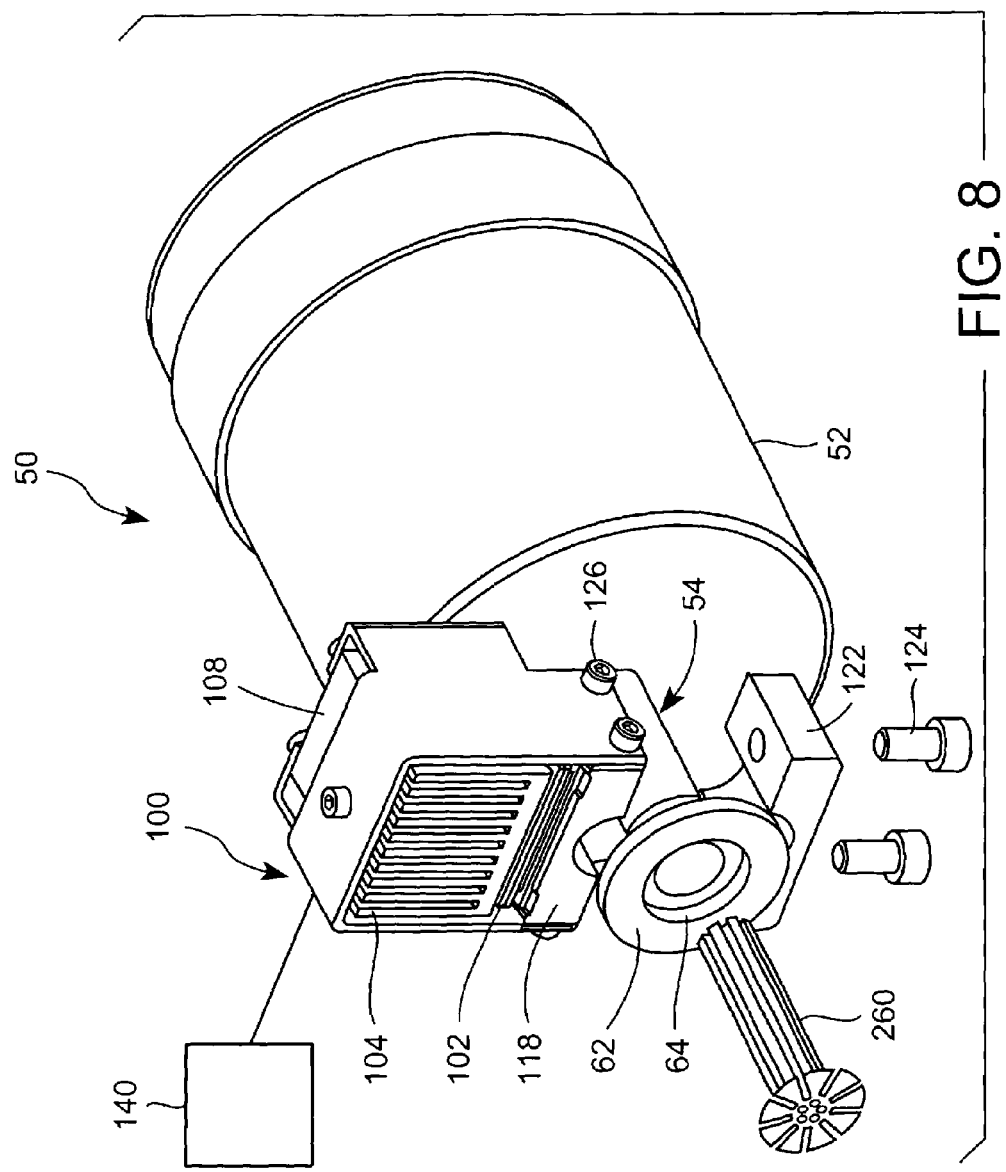
FIG. 8 illustrates a preferred embodiment of the capacitive manometer including a cooling unit.
Figure 9:
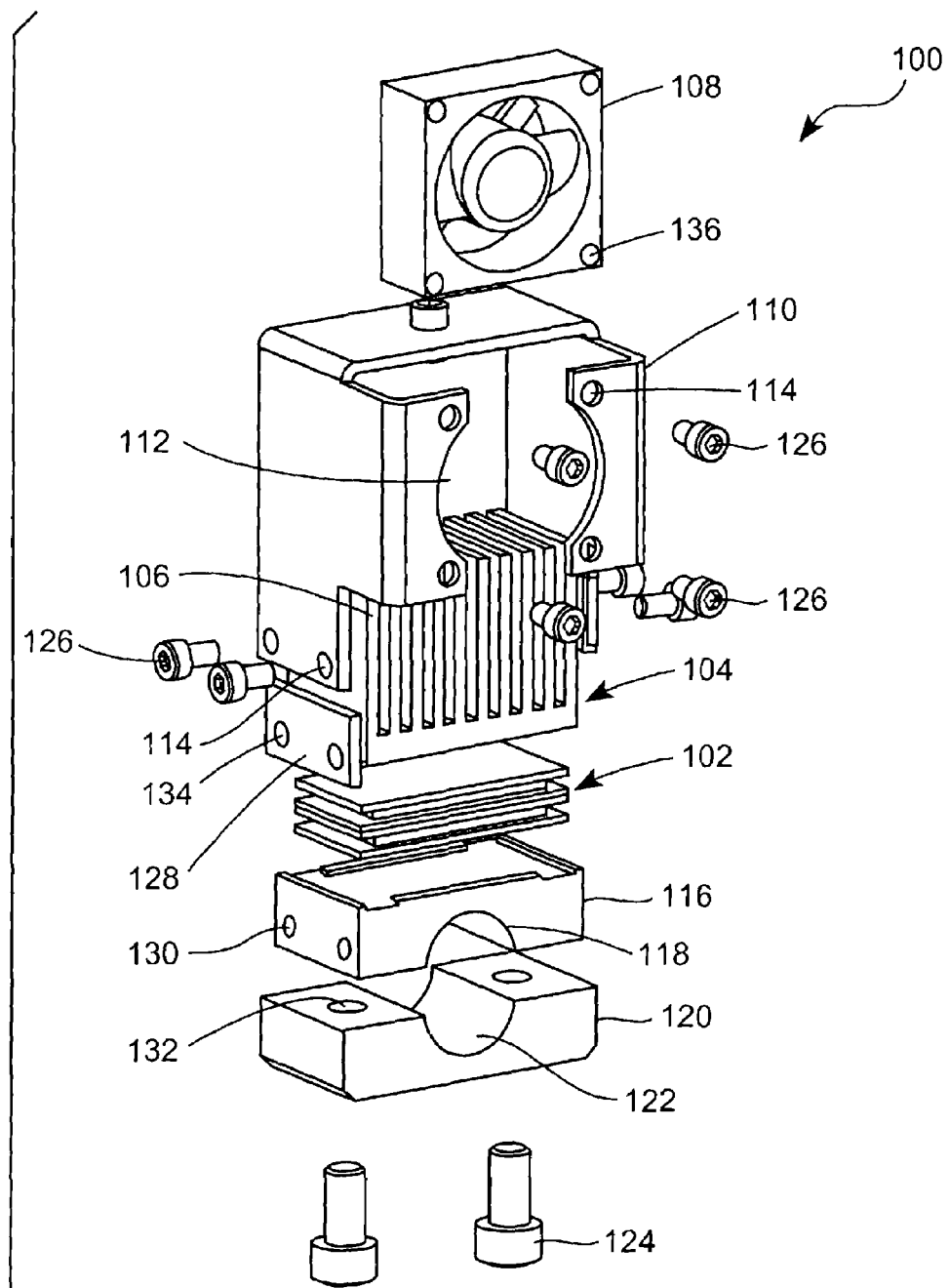
FIG. 9 is an exploded view of the cooling unit shown in FIG. 8.

FIGS. 8 and 9 show a preferred embodiment of a cooling unit 100 configured to be arranged along the flow passage 54 upstream of the diaphragm (not shown). The cooling unit 100 is operable to cool the filter, for example, filter 260, disposed in the flow passage 54. As a result, condensable gaseous material passing through the flow passage 54 is cooled by contact with the cooled filter 260. At low pressures, such as operating pressures in the reaction chamber of a plasma processing apparatus, the cooled condensable gaseous material transforms to a solid and is removed from the gas by the filter 260. Accordingly, the cooling unit 100 can reduce the amount of condensable material present in the gas that may potentially reach the diaphragm 58 of the manometer 50 and form undesirable deposits on the front side 70.

The cooling unit 100 preferably includes a Peltier cooler 102, a heat sink 104, a fan 108, and a power source 140. The power source 140 can be, for example, a 15 V or 24 V direct current power supply. The cooling unit 100 preferably comprises a clamp, such as one including clamping members 116 and 120. The clamping members 116 and 120 have respective surfaces 118 and 122 configured to mount the cooling unit 100 to the flow passage 54. In the preferred embodiment, fasteners 124 are removably received in holes 132 of the clamping member 120 and mating holes (not shown) in the clamping member 116. The cooling unit 100 includes a housing 110, which encloses the clamping member 116, Peltier cooler 102 and heat sink 104 in the assembled condition of the cooling unit 100 shown in FIG. 8. Fan mount isolators 128 preferably are disposed between the housing 110 and the clamping member 116. The fan mount isolators 128 are preferably made of a material having heat transfer properties effective to provide thermal isolation. The cooling unit 100 preferably includes fasteners 126, which are removably inserted in holes 130 in the clamping member 116, holes 134 in the fan mount isolators 128, holes 114 in the housing 110, and holes 136 in the fan 108, to detachably assemble the cooling unit 100.

The clamping members 116 and 120 are preferably of a material having suitable heat transfer properties to sufficiently transfer heat from the flow passage 54 to the cooling unit 100. For example, the clamping members can be of metals including, but not limited to, aluminum, aluminum alloys, copper and copper alloys, as well as other suitable non-metallic materials, such as metal-containing ceramics and polymers. The clamping member 118, Peltier cooler 102 and heat sink 104 are preferably in intimate thermal contact with each other to enhance heat transfer from the flow passage 54 to the heat sink 104. The housing 110 includes an opening 112 through which air is drawn into the fan 108 and distributed over the heat sink 104.

The cooling unit 100 is operable to cool the filter 260 in the flow passage 54. Particulary, power is supplied to the Peltier cooler 102 by the power source 140. The Peltier cooler 102 includes plates composed of dissimilar metals. A junction between the dissimilar metals is heated or cooled depending on the direction of current flow through the metals. Heat removed from the filter 260 is transferred through the clamping member 116, Peltier cooler 102 and dissipated by the heat sink 104. The heat sink 104 preferably includes a plurality of fins 106 to enhance heat transfer. The fan 108 circulates air over the fins 106 to increase the rate of heat transfer from the heat sink 104. The cooling unit 100 preferably is operable to cool the filter to a temperature of less than about 15° C., such as from about 5° C. to 10° C. Condensable vapors that collide with surfaces of gas passages of the cooled filter 60 lose energy during the collisions and, as a result, are cooled and remain on the filter. Consequently, the removed condensable vapors are prevented from deposition on the diaphragm 58 of the manometer 50.

Figure 10:
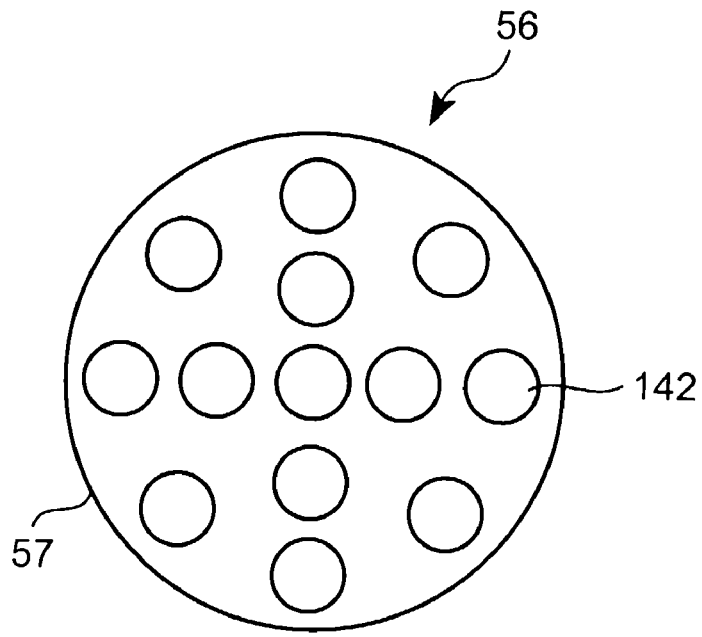
FIG. 10 illustrates a preferred embodiment of the baffle of the capacitive manometer.

FIG. 10 illustrates a preferred embodiment of the baffle 56. The baffle 56 preferably includes a plurality of gas passages 142 and a peripheral edge 57. As shown in FIG. 2, gas that passes through the filter 60 in the flow passage 54 can flow around the peripheral edge 57 and/or through the gas passages 142 of the baffle 56. The gas passages 142 are preferably distributed in the baffle 56 to control the deposition pattern of condensable vapors, which pass through the gas passages 142, on the front side 70 of the diaphragm.

Figure 11:
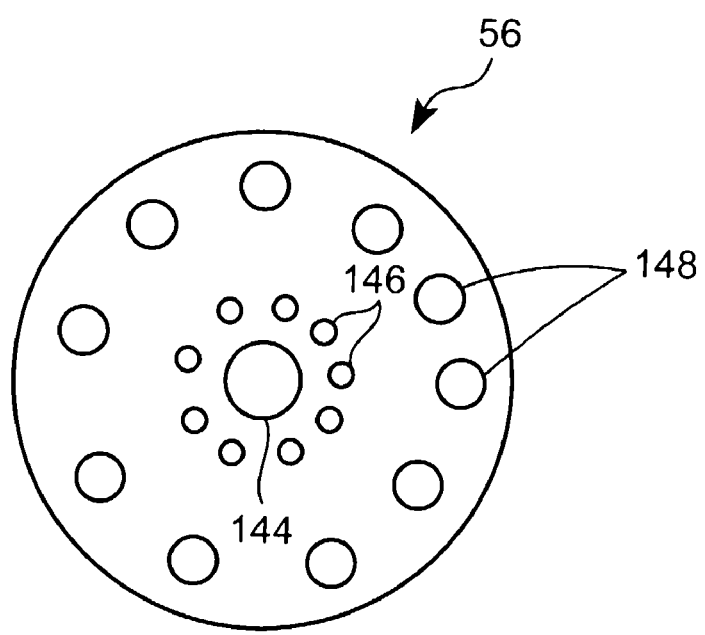
FIG. 11 illustrates another preferred embodiment of the baffle of the capacitive manometer.

FIG. 11 illustrates another preferred embodiment of the baffle 56. The baffle 56 includes concentrically arranged gas passages 144, 146, 148. The central gas passage 144 controls center deposition on the front side 70 of the diaphragm 58, while the gas passages 146 and 148 control deposition radially toward the peripheral edge 57. The size, shape and number of gas passages of the baffle 56 can be varied to control deposition on the diaphragm 58.

Preferably, the gas passages 142 and the gas passages 144, 146, 148 are arranged in the baffle 56 to produce a controlled spatial deposition pattern of deposits on the front side 70 of the diaphragm 58, such as a spatially uniform deposition pattern, that minimizes net deflection of the diaphragm 58. Consequently, offset or drift in pressure readings provided by the manometer 50 related to the deposits preferably can be minimized by incorporating the baffle 56.

The baffle 56 can be used in the manometer 50 with or without the filter 60. In a preferred embodiment of the manometer 50, the baffle 56 is used in combination with the filter 60, such as shown in FIG. 2. As the filter 60 can remove condensable vapors from gas within the flow passage upstream of the baffle 56, the filter 60 can also reduce the amount of such condensable vapors that may reach the baffle 56. Condensable vapors that may pass through the filter 60 are preferably caused to deposit in a controlled manner on the diaphragm 58 by the distribution of gas passages in the baffle 56. In embodiments of the manometer that include both a filter and a baffle, the downstream end 78 of the filter 60 is preferably spaced from the diaphragm 58 by less than about 5 mm, with the baffle 56 located between the filter and the diaphragm 58.

The baffle 56 can be of any suitable material, such as, for example, the above-described materials that can be used for the filter 60.

The baffle 56 and filter 60 can be used in preferred embodiments of the manometer 50 with or without the cooling unit 100. As described above, the cooling unit 100 can enhance the removal of condensable vapors from the gas by cooling the filter 60, which can further reduce the amount of such condensable vapors that may reach the baffle 56 and filter 60.

As described above, the capacitive manometer can be used in a plasma processing apparatus to measure reaction chamber pressure during various plasma processing operations, such as plasma etching, physical vapor deposition, chemical vapor deposition (CVD), ion implantation and resist removal. The manometer can provide reduced deposition of volatile gaseous materials on the diaphragm. Accordingly, the manometer can preferably provide reduced process drift and improved process control capabilities.

While the invention has been described in detail with reference to preferred embodiments thereof, it will be apparent to those skilled in the art that various changes and modifications can be made, and equivalents employed, without departing from the scope of the appended claims.

What is claimed is:

1. A capacitive manometer, comprising:
   a housing;
   a diaphragm inside the housing;
   a flow passage through which gas enters the housing; and
   a filter in the flow passage, the filter including a body having a downstream end which is spaced less than about 5 mm from the diaphragm, the body having a length along the flow passage which is greater than a maximum transverse dimension of the body, the filter including at least one gas passage extending along the length of the body, the gas passage being capable of removing condensable vapors from the gas.

2. The capacitive manometer of claim 1, further comprising a baffle including at least one gas passage disposed between the filter and the diaphragm.

3. The capacitive manometer of claim 1, wherein the filter comprises a plurality of gas passages extending longitudinally along the body.

4. The capacitive manometer of claim 3, wherein the plurality of gas passages includes a plurality of gas passages extending longitudinally along an outer surface of the body.

5. The capacitive manometer of claim 4, wherein the plurality of gas passages further includes at least one gas passage spaced from the outer surface.

6. The capacitive manometer of claim 1, wherein the body has an outer surface and a plurality of gas passages spaced from the outer surface and extending longitudinally along the body.

7. The capacitive manometer of claim 1, wherein the filter comprises a flange at an end of the body, and the flange is configured to retain the filter in the flow passage.

8. The capacitive manometer of claim 1, wherein the at least one gas passage includes one or more gas passages which each have a first portion, a second portion spaced from the first portion and a connecting portion which provides fluid communication between the first portion and the second portion.

9. The capacitive manometer of claim 1, wherein the filter has a spiral configuration.

10. The capacitive manometer of claim 1, wherein the filter is of metal, graphite or polymer material.

11. A plasma processing apparatus comprising a reaction chamber and the capacitive manometer according to claim 1 in fluid communication with the reaction chamber, the capacitive manometer being operable to measure gas pressure in the reaction chamber.

12. A capacitive manometer, comprising:
   a housing;
   a diaphragm inside the housing;
   a flow passage through which gas enters the housing;
   a filter in the flow passage upstream of the diaphragm, the filter including at least one gas passage and being capable of removing condensable vapors from the gas; and
   a cooling unit disposed along the flow passage and operable to cool the filter.

13. The capacitive manometer of claim 12, wherein the cooling unit comprises a Peltier cooler.

14. The capacitive manometer of claim 13, wherein the cooling unit further comprises:
   a heat sink disposed to transfer heat from the Peltier cooler; and
   a fan disposed to circulate air over the heat sink.

15. The capacitive manometer of claim 12, wherein the cooling unit further comprises a thermally conductive clamp arranged along the flow passage.

16. The capacitive manometer of claim 12, wherein the cooling unit is operable to cool the filter to a temperature less than about 15° C.

17. The capacitive manometer of claim 12, further comprising a baffle between the filter and the diaphragm, the baffle including at least one gas passage.

18. A plasma processing apparatus comprising a reaction chamber and the capacitive manometer according to claim 12 in fluid communication with the reaction chamber, the capacitive manometer being operable to measure gas pressure in the reaction chamber.

19. A capacitive manometer, comprising:
   a housing;
   a diaphragm inside the housing;
   a flow passage through which gas enters the housing; and
   a filter arranged along the flow passage upstream of the diaphragm, the filter including at least one gas passage and being capable of removing condensable vapors from the gas, the at least one gas passage having (i) a maximum transverse dimension, (ii) a length and (iii) an aspect ratio defined by a ratio of the length to the maximum transverse dimension of at least about 10.

20. The capacitive manometer of claim 19, further comprising a baffle including at least one gas passage disposed between the filter and the diaphragm.

21. A capacitive manometer, comprising:
a housing;
a diaphragm inside the housing;
a flow passage through which gas enters the housing;
a filter arranged along the flow passage upstream of the diaphragm, the filter including at least one gas passage and being capable of removing condensable vapors from the gas, the at least one gas passage having (i) a maximum transverse dimension, (ii) a length and (iii) an aspect ratio defined by a ratio of the length to the maximum transverse dimension of at least about 10; and
a cooling unit arranged along the flow passage and operable to cool the filter.

22. A plasma processing apparatus comprising a reaction chamber and the capacitive manometer according to claim 19 in fluid communication with the reaction chamber, the capacitive manometer being operable to measure gas pressure in the reaction chamber.

23. A capacitive manometer, comprising:
a housing;
a diaphragm inside the housing, the diaphragm having a face exposed to a gas;
a flow passage through which the gas enters the housing; and
a baffle disposed in the flow passage upstream of the diaphragm, the baffle including a plurality of gas passages extending therethrough, the gas passages having an arrangement in the baffle that controls spatial deposition of condensable vapors contained in the gas, which pass through the gas passages and deposit on the face of the diaphragm, such that condensable vapors deposited on the face of the diaphragm cause substantially no drift of the capacitive manometer.

24. The capacitive manometer of claim 23, further comprising a filter arranged in the flow passage, the filter including at least one gas passage extending therethrough, and the filter being capable of removing condensable vapors from the gas.

25. A capacitive manometer, comprising:
a housing;
a diaphragm inside the housing, the diaphragm having a face exposed to a gas;
a flow passage through which the gas enters the housing;
a baffle disposed in the flow passage upstream of the diaphragm, the baffle including a plurality of gas passages extending therethrough, the gas passages having an arrangement in the baffle that controls spatial deposition of condensable vapors contained in the gas, which pass through the gas passages and deposit on the face of the diaphragm, such that condensable vapors deposited on the face of the diaphragm cause substantially no drift of the capacitive manometer; and
a cooling unit disposed along the flow passage and operable to cool the filter.

26. A plasma processing apparatus comprising a reaction chamber and the capacitive manometer according to claim 23 in fluid communication with the reaction chamber, the capacitive manometer being operable to measure gas pressure in the reaction chamber.

* * * * *